Patented Oct. 11, 1932

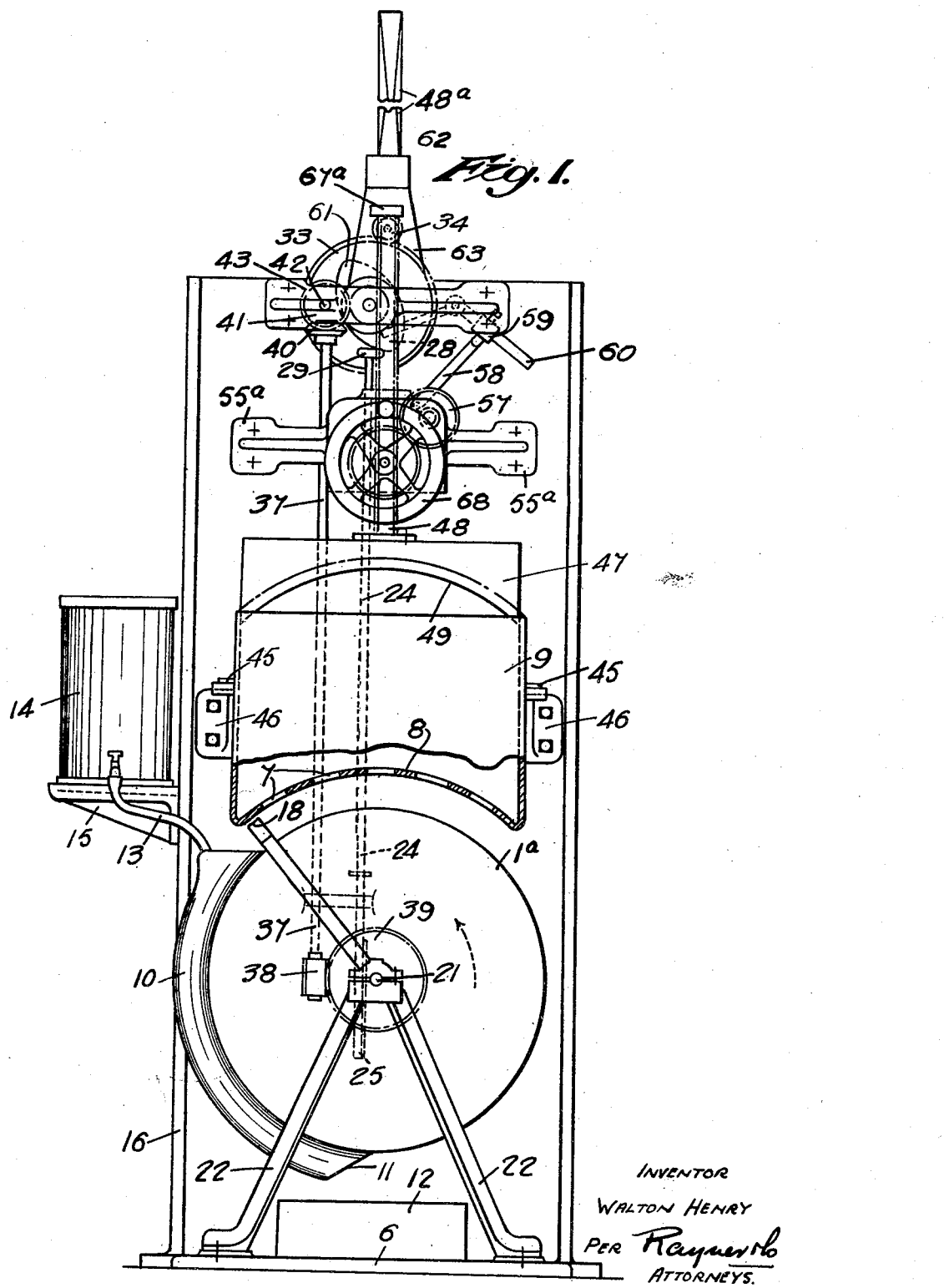

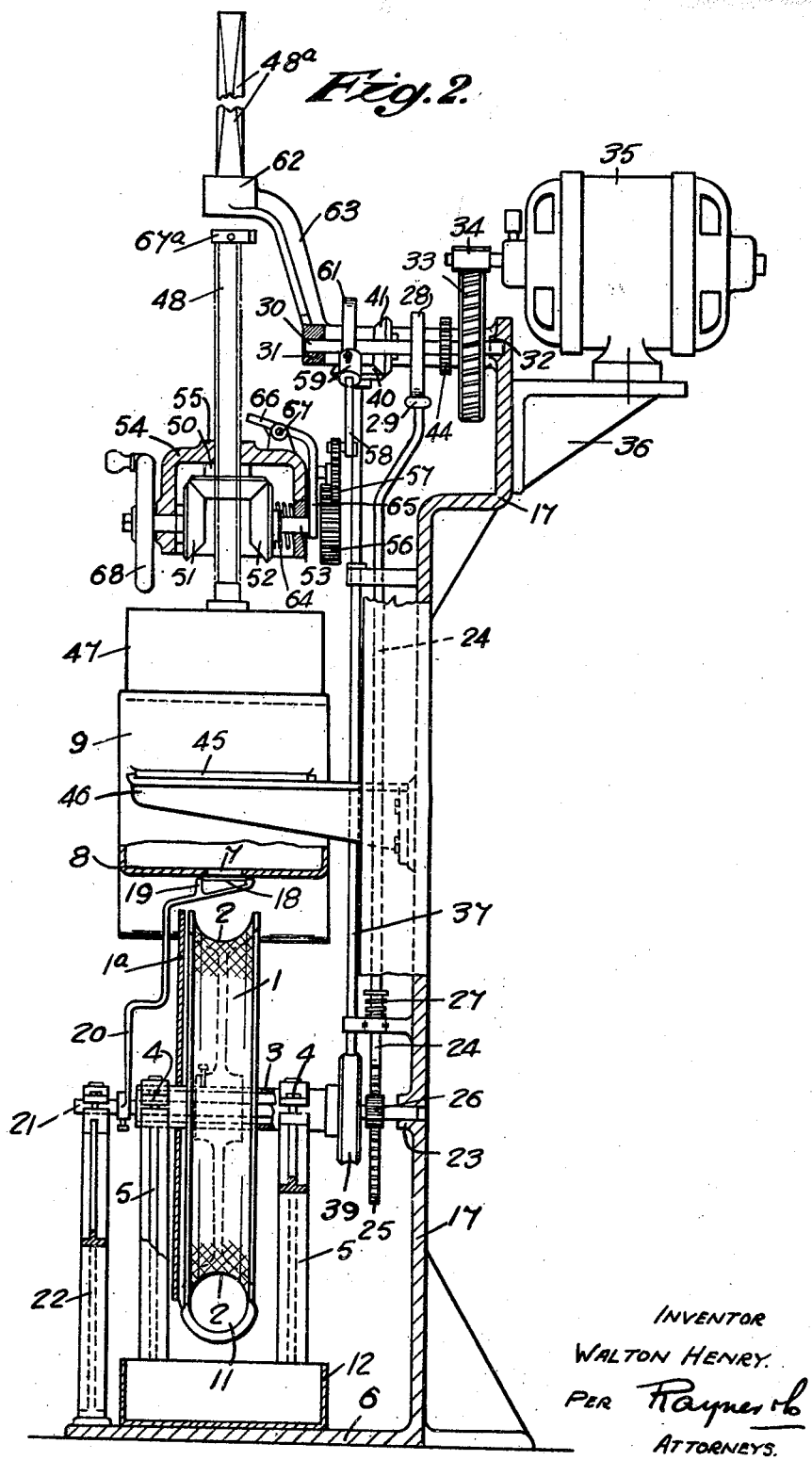

1,882,143

UNITED STATES PATENT OFFICE

WALTON HENRY, OF BLOOMFIELD, BELFAST, NORTHERN IRELAND

MACHINE FOR MOLDING BUTTER AND THE LIKE

Application filed July 27, 1931, Serial No. 553,427, and in Great Britain September 11, 1930.

This invention relates to a machine for molding butter and the like and is primarily intended for use in connection with the production of balls, rolls or other suitably shaped portions of butter for service at tables in hotels, restaurants and the like.

The object of the invention is to provide a simple and effective machine or apparatus which will be automatic in operation and will quickly and efficiently produce the desired shaped balls or rolls of butter or the like from a mass of the material placed in a suitable receptacle.

Broadly the present invention comprises means for extruding butter or the like on to a rotary member co-operating with a shaping member to impart the desired configuration to the extruded butter or the like.

According to the preferred form of this invention the butter or the like in suitable mass is placed in a receptacle or container and caused to exude from apertures therein by pressure. As the butter or the like exudes from the apertures it is removed or severed in the form of portions or pellets. These portions or pellets are in turn delivered to a rotary molding device which forms them to the desired shape and delivers them into a receptacle or collecting means. The molding means preferably comprises a rotating drum or wheel and a stationary casing or molding member of the desired cross sectional shape arranged so that the portion or pellet of butter will be rolled between them and be thus molded to the desired form. The receptacle for the butter or the like comprises a suitable chamber having any desired number of apertures of convenient form through which the butter may exude under the influence of pressure applied to a plunger adapted to be automatically or by hand moved into the chamber so as to force out the butter from the apertures. The butter protruding from the apertures is cut off or severed by a movable blade which is traversed along the face of the container at intervals so as to cut off the butter to portions of predetermined size or weight.

Motion may be transmitted to the plunger through a suitable train of gearing adapted to actuate the plunger step by step through the medium of a cam and crank mechanism to produce an intermittent rotation of a wheel in one direction only for the purpose of feeding the plunger into the container. Means may be provided for varying the rate of feed or the extent of each step of the motion so as to vary the rate of delivery or the size of the portions or pellets of butter or the like. The device may be operated by hand or by electric or other motor being driven at a suitable slow speed to enable the device to operate efficiently. The butter container may be surrounded by a cooling chamber containing water or a suitable freezing mixture and cold or cooled water may be fed to the revolving drum or wheel and the stationary molding surface so as to prevent the butter or the like adhering thereto.

In carrying my invention into practice as applied to an automatic molding machine for producing balls, rolls or other suitably shaped portions of butter I employ a suitable rotatable wheel or drum mounted within a casing and having located at one side thereof a stationary molding surface in the form of a trough or channel of the desired shape. Located above the rotating drum or wheel is a container for the butter, the lower surface of which is preferably of arcuate shape to conform with the periphery of the molding wheel or drum. This chamber may be surrounded with a cooling tank for water, brine, ice or the like. In the base of the chamber are a series of apertures through which the butter may be caused to exude by pressure applied to it by a plunger adapted to be forced into the chamber by automatic feeding means. A suitable blade or knife is arranged to be moved automatically at the desired intervals to cut off or detach the portions of butter exuding through the apertures in the base of the chamber. This blade or knife may be mounted on an arm pivoted round the axis of the drum so that it will move in an arcuate path over the curved undersurface of the chamber. The knife or blade is actuated at the required intervals through the medium of cam or other mechanism driven by gearing from any convenient part of the moving mechanism. As the blade moves across the undersurface of the chamber the exuding portions of butter will be cut off one by one and dropped onto the surface of the rotating drum or wheel. This will carry them round to the stationary molding channel. This channel is detachably fixed in the casing adjacent to the periphery of the drum a portion of which it encircles. The periphery of the drum and the channel are shaped or hollowed out to form between them an opening or curve of the desired sectional area according to the shape to which the butter is to be molded. The operative surface of the channel and the drum or wheel may be curved, serrated or otherwise decorated to produce any desired ornamentation on the surface of the balls or rolls of butter. The molding drums or wheels and the stationary channels are adapted to be readily removed from the machine and may be interchanged with others for producing varying patterns or shapes of molded butter rolls or pats.

The plunger for pressing the butter through the apertures in the chamber is fed automatically through the medium of a step by step mechanism actuated through suitable gearing interconnected with the driving mechanism for the rotary rolling drum and the movable blade for cutting off the portions of butter. These are all interconnected in such a manner that they will act in the desired sequence and manner. The plunger is mounted on suitable guides and is adapted to be moved along them toward or away from the container through the medium of screw or other mechanism. A suitable hand wheel may be provided to enable the plunger to be actuated by hand when desired. When the machine is in operation the plunger is actuated automatically through suitable gearing and for this purpose a crank and link mechanism is arranged to transmit motion to the plunger at intervals and the extent of this motion may be varied or adjusted by regulating or adjusting the position at which the crank is connected to the link. Suitable cam or other mechanism is arranged to interconnect the link with the driving mechanism and means are provided to throw this cam operating device out of operation when the plunger has been forced right down to the bottom of the chamber so as to disconnect the plunger from the feeding mechanism and prevent overfeeding after the whole or substantially the whole of the butter has been pressed out of the container. The rotating molding drum or wheel will continue to operate so as to mold the last portions of butter pressed out of the plunger, but the drive may be discontinued or switched off soon after the downward feeding of the plunger has stopped. A suitable container may be arranged alongside the butter chamber and over the opening leading to the stationary channel or molding member. This container may be filled with water and a regulatable aperture provided to enable the water to drip continuously into the mouth of the molding opening and onto the surface of the molding drum or wheel. The surfaces will thus be kept wet and will prevent the butter from sticking thereto. One or both ends but especially the entry end of the stationary molding member is splayed or enlarged to permit the portion of butter to enter freely, and the channel may be so shaped as to apply the molding pressure or action gradually to the portion of butter as it passes round the channel.

In order that my invention may be clearly understood and readily carried into effect I have appended hereto a sheet of drawings illustrating an embodiment thereof, and wherein:—

Fig. 1 is a part sectional elevation view, and

Fig. 2 is a sectional side elevation view.

Referring to the drawings I have shown an apparatus suitable for producing balls, rolls or other suitably shaped portions of butter and it consists of a drum 1 with a substantially semi-circular channelled periphery 2 and fixed to a hollow shaft 3 rotating in bearings 4 formed in brackets 5 extending upwards from a base 6. The butter is extruded through holes 7 in the base 8 of a container 9 on to the periphery of the drum 1 and the drum is rotated to carry the extruded butter in the form of pellets or pats from beneath the container 9 in an arcuate path concentric with a substantially semi-circular arcuate guide 10 which is preferably flared at its upper end as shown to facilitate ingress of the butter, the lower end of this guide being cut at an inclined angle to produce a mouth 11 which delivers the shaped portions of butter into receptacle 12. The periphery 2 of the drum 1 is preferably formed with grooves or ribs and the inner surface of the guide 10 is also preferably likewise provided with means for imparting markings to the butter pats. Water is delivered slowly through a pipe 13 into the guide 10 from a vessel 14 to facilitate the passage of the butter through the guide 10 and to moisten the periphery of the drum 1 and the inner surface of the guide 10 to prevent the butter sticking. The vessel 14 can be detachably mounted on a bracket 15 extending from a side web 16 of a vertical plate 17 integral with the base 6 and carrying the extruding mechanism of the apparatus.

The butter extruded through the holes 7 is severed by an oscillating cutter 18 which as shown can be a wire stretched across the limbs of a bifurcated free end 19 of an arm 20 fixed to a shaft 21 journalled in bearings in a bracket 22 and a boss 23 on the plate 17. This shaft 21 rotates concentrically within and relative to the hollow shaft 3 carrying the drum 1 and it is rotated intermittently in alternate directions by the reciprocation of a vertical rod 24 formed with a line of gear teeth 25 at its lower end meshing with a gear wheel 26 on the shaft 21. This rod 24 is moved downwards against the influence of a coiled compression spring 27 by the rotation of a cam 28 the periphery of which engages a head 29 on the upper end of the rod 24. The cam 28 is fixed to a shaft 30 journalled in bearings in a bracket 31 fixed to the plate 17 and a boss 32 in the upper end of the said plate. The shaft 30 is driven through reduction gear wheels 33 and 34 from a motor 35 mounted on a bracket 36 fixed to the upper end of the plate 17.

The drum 1 is driven constantly in a uniform direction by a vertical shaft 37 the lower end of which carries a worm 38 meshing with a worm wheel 39 on the hollow shaft 3. The upper end of this shaft 3 is fitted with a bevel pinion 40 meshing with a bevel pinion 41 on a lay shaft 42 on which is fixed a gear wheel 43 meshing with a gear wheel 44 in the shaft 30.

The base 8 of the container 9 is arcuate concentrically with the drum 1 and the path of travel of the cutter 18 which is contiguous to such base. The container 9 is preferably readily detachable to facilitate recharging and cleaning and for such purpose it can be formed with a pair of side ribs 45 adapted to rest upon a pair of brackets 46 bolted to the plate 17. The butter is extruded from the container 9 by a ram 47 fixed to the lower end of a vertical feed bar 48 and preferably formed with an arcuate base 49 to conform with the curvature of the base 8 of the container 9 to ensure almost complete extrusion of the butter from the container. The ram 47 is fed intermittently downwards alternately with the movements of the cutter 18 and this can be effected by any suitable mechanism. The mechanism illustrated for this purpose comprises a nut 50 threaded about the feed bar 48 and formed as a bevel gear wheel meshing with an idle gear wheel 51 and a gear wheel 52 fixed to a spindle 53 rotating in a wall of a housing 54 fixed by brackets 55ᵃ to the vertical plate 17. This housing 54 is formed with an apertured boss 55 through which the feed bar 48 is splined so that the feed bar is free to move axially but not to rotate, by the action of the bevel nut 50. The spindle 53 carries a gear wheel 56 with which meshes a gear wheel 57 mounted on a spindle which may be fixed or may rotate in the housing 54. The gear wheel 57 is rotated by a one-way clutch or pawl and ratchet or equivalent device, the pawl or equivalent member of which is carried by one end of a link 58 which can also be pivoted at such end to a crank loose on the spindle of the gear wheel 57. The other end of this link is pivoted to a collar 59 adjustable along one limb of a wide V shaped lever 60 fulcrumed at its apex and its other limb engaged by the periphery of a cam 61 on the shaft 30 and with its maximum radius diametrically opposite the maximum radius of the cam 28.

Instead of or in addition to the guide boss 55, the feed bar 48 can be provided with an extension 48a of square section guided through a collar 62 on the free end of an arm 63 extending from the bracket 31. It is preferred that when the feed bar has delivered the ram 47 to its predetermined lowest position that the movement of the ram shall be automatically stopped. This can be effected by mounting the spindle 53 operating the nut 50 so that it will slide axially in the housing 54 against the influence of a coiled compression spring 64 in order to disengage the bevel members 52 and 50, the requisite sliding action being effected by a depending bifurcated arm 65 of a cranked lever 66 fulcrumed at 67 being pressed against the gear wheel 56 by reason of an adjustable abutment 67ᵃ on the feed bar 48 striking the lever 66, the location of this abutment being such that it strikes the lever 66 when the ram 47 nearly contacts with the base 8, the rotation of the drum 1 however, being continued as long as may be necessary to effect the molding and final ejection of the pats of butter already extruded and on the drum 1.

The idle gear wheel 51 meshing with the nut 50 can be rotated by hand to raise the ram 47, its spindle being fitted with a hand-wheel 68 for the purpose. A suitable safety guard 1a may be provided to protect the drum 1 and may be integral with or separate to the guide 10 which is readily interchangeable together with the drum 1 to obtain variously shaped pats of butter.

A machine for molding butter or the like to suitable forms for service at tables in hotels, restaurants or other places may be constructed in a compact form and will quickly and efficiently mold portions of butter or the like to any of a number of predetermined shapes. The operation of the machine is quick and effective and effects a considerable saving in time and labor.

I claim:—

1. Apparatus for molding butter or the like comprising a container for butter, an extrusion aperture in said container, a member displaceable in the container for extruding butter through said aperture in the container, a cutting device mechanically moved in a path contiguous to said aperture for removing portions of butter, and a rotating butter shaping member on to which the severed portions of butter are delivered and shaped, a shaft carrying said rotary shaping device, a further shaft rotating concentrically in the aforementioned shaft, and an arm carrying at one end the said cutting device and secured at its other end to the inner of the said two shafts.

2. Apparatus for molding butter and the like comprising a frame, a rotary prime mover on said frame, a shaft driven by said prime mover, a pair of cams on said shaft, a spring loaded tappet member reciprocated by one of said cams, a further shaft reciprocated by said tappet member, a cutting device carried by said further shaft, a butter container with an arcuate apertured base close to the path of reciprocation of said cutting device, a plunger adapted to extrude butter from the said container through the apertures in said base, a rotary circular member with a channel section periphery contiguous to said cutting device, and an arcuate butter molding guide of channel section close to said periphery and concentric therewith.

3. Apparatus for molding butter or the like comprising a power driven shaft, a nut driven thereby, a feed screw fed axially by said nut, a plunger carried by said feed screw, a receptacle accommodating said plunger and adapted to accommodate butter, an arcuate base to said receptacle, apertures in said base through which the butter is extruded, a drum rotating beneath said base and a cutter reciprocated in an arcuate path contiguously to said base, said drum comprising a butter shaping device, means gearing said shaft to said drum and said cutter, and an arcuate channel section molding member partially encircling said drum.

WALTON HENRY.